US008334674B2

(12) United States Patent
Kim

(10) Patent No.: US 8,334,674 B2
(45) Date of Patent: Dec. 18, 2012

(54) HYBRID BATTERY AND ITS CHARGING/DISCHARGING METHOD

(75) Inventor: Bongyoung Kim, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 126 days.

(21) Appl. No.: 12/007,167

(22) Filed: Jan. 7, 2008

(65) Prior Publication Data

US 2008/0169785 A1    Jul. 17, 2008

(30) Foreign Application Priority Data

Jan. 17, 2007   (KR) .................. 10-2007-0005429
Jan. 17, 2007   (KR) .................. 10-2007-0005430
Oct. 30, 2007   (KR) .................. 10-2007-0109721

(51) Int. Cl.
   *H02J 7/00*   (2006.01)
(52) U.S. Cl. ...................... 320/124; 320/134
(58) Field of Classification Search .......... 320/116, 320/118, 119, 124, 128, 132, 134, 136
   See application file for complete search history.

(56) References Cited

U.S. PATENT DOCUMENTS

| | | | |
|---|---|---|---|
| 5,583,384 A | 12/1996 | Henry | |
| 5,652,499 A | 7/1997 | Morita et al. | |
| 5,818,200 A * | 10/1998 | Cummings et al. | 320/116 |
| 5,867,007 A | 2/1999 | Kim | |
| 6,051,955 A | 4/2000 | Saeki et al. | |
| 6,268,710 B1 | 7/2001 | Koga | |
| 6,373,222 B2 * | 4/2002 | Odaohhara | 320/116 |
| 6,452,362 B1 * | 9/2002 | Choo | 320/116 |
| 7,064,521 B2 * | 6/2006 | Stanesti et al. | 320/126 |
| 2004/0011944 A1 | 1/2004 | Rohrbacher et al. | |
| 2005/0116686 A1 * | 6/2005 | Odaohhara | 320/116 |
| 2008/0048621 A1 * | 2/2008 | Yun | 320/136 |

FOREIGN PATENT DOCUMENTS

| | | |
|---|---|---|
| CN | 1044954 C | 9/1999 |
| JP | 1998-322915 | 12/1998 |
| JP | 2000-253595 | 9/2000 |
| JP | 2004-104988 | 4/2004 |
| JP | 2006-221943 | 8/2006 |
| KR | 10-2004-0103717 A | 12/2004 |
| KR | 10-2006-0022558 A | 3/2006 |
| KR | 1020060037018 A | 5/2006 |
| WO | 2005/088804 A1 | 9/2005 |

OTHER PUBLICATIONS

Chinese Office action issued by SIPO on Dec. 31, 2011, corresponding to Chinese Patent Application No. 200810002354.4 and its English Translation attached herewith.

* cited by examiner

*Primary Examiner* — Ramy Ramadan
(74) *Attorney, Agent, or Firm* — Robert E. Bushnell, Esq.

(57) ABSTRACT

A hybrid battery and its charging/discharging method automatically charges/discharges batteries having different capacities. The hybrid battery includes a plurality of rechargeable batteries; switching elements which are electrically connected to the plurality of rechargeable batteries having high current paths for electrically connecting to one of the high current paths; and a hybrid battery protection circuit electrically connected to the plurality of rechargeable batteries and driven by power supplied by one of the plurality of rechargeable batteries, the hybrid battery protection circuit charging/discharging the plurality of rechargeable batteries in sequence by transmitting an on/off signal to the switching element.

3 Claims, 7 Drawing Sheets

HYBRID BATTERY AND ITS CHARGING/DISCHARGING METHOD

CLAIM OF PRIORITIES

This application makes reference to, incorporates the same herein, and claims all benefits accruing under 35 U.S.C. §119 from the applications for HYBRID BATTERY AND CHARGING/DISCHARGING METHOD FOR THE SAME, earlier filed in the Korean Intellectual Property Office, Korean Patent Application No. 2007-0005429, filed on 17 Jan. 2007; No. 2007-0005430, filed on 17 Jan. 2007; and No. 2007-0109721, filed on 30 Oct. 2007.

BACKGROUND OF THE INVENTION

1. Field of the Invention

The present invention relates to a hybrid battery and its charging/discharging method, and more specifically, the present invention relates to automatically charging/discharging batteries having different capacities.

2. Description of the Related Art

Recently, compact and lightened portable electrical/electronic devices have been quickly developed and produced, including cellular phones, notebook computers, camcorders, etc. Accordingly, the portable electrical/electronic devices have built-in battery packs in order that they may be operated in a place where a separate power source is not supplied. The battery packs recently employ batteries which may be charged and discharged simultaneously, taking economy into consideration. Such batteries typically include Ni—Cd batteries, Ni-MH batteries, Li batteries and Li-ion secondary batteries. An operational voltage of a Li-ion secondary battery is three times as high as that of a Ni—Cd battery or an Ni-MH battery which is usually used as a power source of portable electronic devices. Furthermore, Li-ion secondary batteries are widely used since they have a high energy density per unit weight.

Such a Li-ion secondary battery uses a Lithium-based oxide as a positive electrode active material and a carbon material as a negative electrode active material. Generally, a battery type is divided into a liquid electrolyte battery and a polymer electrolyte battery according to the electrolyte type, where a battery using the liquid electrolyte is called a Li-ion battery and a battery using the polymer electrolyte is called a Lithium polymer battery. Furthermore, lithium secondary batteries are manufactured in different types, representatively including a cylindrical type, a square type and a pouch type.

A battery of such shapes is connected to a protection circuit, which is used to select charging or discharging of the battery or to cut off power when the battery is overcharged or when excessive current flows through the battery, thus protecting the battery. One or a plurality of batteries along with the protection circuit is connected in series or in parallel with portable electronics. When the battery is used in portable electronics consuming a large amount of power, such as a notebook computer, generally a plurality of cylindrical type batteries are connected in series and in parallel, thus increasing the running time and power output of battery.

The plurality of cylindrical type batteries mounted in the thin portable electronics, such as a notebook computer, each have the same capacity and size. When the cylindrical type batteries of the same size are mounted in the portable electronics, for example, a notebook computer, there may be formed a space in the notebook computer. When the pouch type battery is mounted in the space, the capacity of the battery may be increased.

However, the pouch type batteries connected to the cylindrical type batteries may have different capacities thereof. If, a protection circuit controls charging/discharging of batteries having different capacities, some batteries whose charging schemes are different to that of the protection circuit may cause non-uniform charging or non-uniform discharging, including over-discharging.

In addition to non-uniform charging/discharging, there are problems of automatically charging/discharging batteries having different capacities, and controlling short and abnormal operation of such batteries.

SUMMARY OF THE INVENTION

It is an aspect of the present invention is to perform stable and balanced charging/discharging of batteries having different capacities.

Also, another aspect of the present invention is to perform charging/discharging using only the power of the batteries.

Also, still another aspect of the present invention is to increase useable space when mounting a mix of different types of rechargeable batteries in portable electronics.

Also, still another aspect of the present invention is to effectively perform charging/discharging while providing battery protection.

According to one aspect of the present invention, a hybrid battery is provided, including: a plurality of rechargeable batteries; a switching element for selecting one of high current paths of the rechargeable batteries by connecting electrically to the high current paths of the rechargeable batteries; a hybrid battery protection circuit electrically connected to the plurality of rechargeable batteries and driven by power supplied from one of the plurality of rechargeable batteries, the hybrid battery protection circuit being electrically connected to the switching element to charge/discharge the plurality of rechargeable batteries in sequence by transmitting an on/off signal to the switching element.

The plurality of rechargeable batteries may be formed by combining can type batteries and pouch type batteries.

The plurality of rechargeable batteries may have different capacities.

The hybrid battery may further include a charging/discharging path selector for selecting a charging path which enables current flowing into the selected batteries to flow in a forward direction and a discharging path which enables current flowing into the selected batteries to flow in a backward direction, the charging/discharging path selector being arranged between the plurality of rechargeable batteries and the switching element.

The hybrid battery may further include a battery identification information part which is electrically connected to the charging/discharging terminal and includes a first capacitor which is electrically connected to positive and negative terminals of the charging/discharging terminal, a second capacitor which is electrically connected to one of the positive and negative terminals, and a resistor which connects the first capacitor to the second capacitor.

According to another aspect of the present invention, a hybrid battery is provided, including: a plurality of rechargeable batteries; a switching element for battery selecting which is electrically connected to a high current path of each rechargeable battery, the number of switching elements corresponding to that of the rechargeable batteries; a switching element for charging/discharging including charging switching elements which are electrically connected to a junction point of the high current paths of the rechargeable batteries and discharging switching elements which are electrically connected to the charging switching elements; and a hybrid battery protection circuit including a voltage detector which is electrically connected to each of the rechargeable batteries for comparing the plurality of battery voltages with a reference voltage and outputting a digital signal corresponding to the voltage value detected by the comparison, and a controller for receiving a digital signal output from the voltage detector, selecting one of the plurality of batteries by outputting an on/off signal to one of the switching elements for battery selecting, and outputting an on/off signal to the charging/discharging switching element which are electrically connected to the high current path of the selected battery, the controller being electrically connected to the switching elements of the charging/discharging switching element.

The hybrid battery protection circuit may further include a over current detector for detecting current flowing on the plurality of rechargeable batteries and turning off the switching element for charging/discharging.

The over current detector may detect a charger connected when the plurality of rechargeable batteries are full discharged, turn on one of the switching elements for charging connected to the plurality of rechargeable batteries, and turn on one of the switching elements for battery selecting.

The hybrid battery protection circuit may further include a switching delay time controller to control switching delay time between the switching elements for charging and the switching elements for discharging, the switching delay time controller further having a passive element connected thereto so as to control switching delay time between the switching elements for charging and the switching elements for discharging.

The hybrid battery protection circuit may be formed of a semiconductor device integrated circuit in a one chip package.

The switching elements for battery selecting may be formed of P-channel field effect transistors and, the switching elements for charging/discharging may be formed of N-channel field effect transistors.

The switching element for charging/discharging may have a parasitic diode for preventing reverse current.

The plurality of rechargeable batteries may be formed by combining can type batteries and pouch type batteries.

According to another aspect of the present invention, a hybrid battery is provided, including: a plurality of rechargeable batteries; a switching element for charging/discharging including switching elements for charging which are electrically connected to the plurality of rechargeable batteries respectively, and switching elements for discharging which are electrically connected to the switching elements for charging, respectively; and a hybrid battery protection circuit including a voltage detector which is electrically connected to the plurality of rechargeable batteries for comparing voltages of the rechargeable batteries with a reference voltage and outputting a digital signal according to the states of the rechargeable batteries, and a controller which is electrically connected to switching elements for the switching part for charging/discharging for receiving a digital signal output from the voltage detector and selectively outputting an on/off signal to the switching elements for charging/discharging.

The hybrid battery protection circuit may further include an over current detector for detecting current flowing in the rechargeable batteries and turning off the switching element for charging/discharging.

The over current detector may detect a charger connected when the rechargeable batteries are fully discharged and turns on one of the switching elements for charging connected to the rechargeable batteries.

A parasitic diode for preventing reverse current may be formed between the controller and the voltage detectors, the parasitic diode for preventing reverse current being connected to the controller and the voltage detectors so as to form a common ground.

The hybrid battery protection circuit may further include a switching delay time controller to control switching delay time between the switching elements for charging and the switching elements for discharging, the switching delay time controller being further connected to a passive element so as to control a switching delay time between the switching element for charging and the switching element for discharging.

The hybrid battery protection circuit may be formed of a semiconductor device integrated circuit in a one chip package.

The switching elements for charging and switching element for discharging may be formed of N-channel field effect transistors.

Each of the switching elements for charging/discharging may have a parasitic diode for preventing reverse current.

The plurality of rechargeable batteries may be formed by combining can type batteries and pouch type batteries.

According to another aspect of the present invention, a hybrid battery is provided, including: a plurality of rechargeable batteries; a switching element for charging/discharging including switching elements for discharging which are electrically connected to a plurality of battery high current paths whose number corresponds to that of the rechargeable batteries, and switching elements for charging which are electrically connected to a high current path where the switching elements for discharging are commonly connected; and a hybrid battery protection circuit including a voltage detector which is electrically connected to the plurality of rechargeable batteries for comparing voltages of the rechargeable batteries with a reference voltage and outputting a digital signal corresponding to the voltage value detected by the comparison, and a controller which is electrically connected to switching elements for the switching part for charging/discharging for receiving a digital signal output from the voltage detector and selectively outputting an on/off signal to the switching elements for discharging and the switching elements for charging.

The hybrid battery protection circuit may further include an over current detector for detecting current flowing in the rechargeable batteries and turning off the switching element for charging/discharging.

The over current detector may detect a charger connected when the rechargeable batteries are fully discharged and turns on one of the switching elements for charging connected to the rechargeable batteries.

A parasitic diode for preventing reverse current may be formed between the controller and the voltage detectors, and the parasitic diode for preventing reverse current is connected to the controller and the voltage detectors so as to form a common ground part.

The hybrid battery protection circuit may further include a switching delay time controller to control switching delay time between the switching elements for charging and the switching elements for discharging, the switching delay time controller being further connected to a passive element so as to control a switching delay time between the switching element for charging and the switching element for discharging.

The hybrid battery protection circuit may be formed of a semiconductor device integrated circuit in a one chip package.

The switching elements for charging and switching elements for discharging may be formed of N-channel field effect transistors or P-channel field effect transistors.

The switching element for charging or the switching element for discharging may have a parasitic diode for preventing reverse current.

The plurality of rechargeable batteries may be formed by combining can type batteries and pouch type batteries.

According to another aspect of the present invention, a method of charging a hybrid battery is provided, including a first step of, when a plurality of rechargeable batteries having capacities different with one another are in a charging state, detecting a charging state of one of the batteries, starting to charge in a charging method depending on the battery capacity of detected battery when the detected battery is not in a fully charged state, and stopping the charging when the detected battery is in the fully charged state; a second step of, when the detected battery is in the fully charged state in the first step, stopping the charging and performing the first step in a charging method adapted to another battery; and a third step of, when all batteries are in a fully charged state, stopping charging of the batteries.

When the plurality of batteries are in the fully charged state during the first to third steps are performed, a step of detecting an over charging state where the plurality of batteries are started is simultaneously performed.

The method of the present invention may further include the step of stopping charging/discharging where charging/discharging switch is turned off, when over current higher than the breakdown current set during the first to third steps flows.

According to another aspect of the present invention, a method of discharging a hybrid battery is provided, including: a first step of, when a plurality of rechargeable batteries having capacities different with one another are in a discharging state, detecting a discharging state of one of the batteries, starting to discharge in a discharging method depending on the battery capacity of detected battery when the detected battery is not in a fully discharged state, and stopping the discharging when the detected battery is in the fully discharged state; a second step of, when the detected battery is in the fully discharged state in the first step, stopping the discharging and performing the first step in a discharging method adapted to another battery; and a third step of, when all batteries are in a fully discharged state, stopping discharging of the batteries.

The method of the present invention may further include the step of stopping charging/discharging by turning off the charging/discharging switch, when an over current higher than a set breakdown current flows during the first to third steps.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1A:
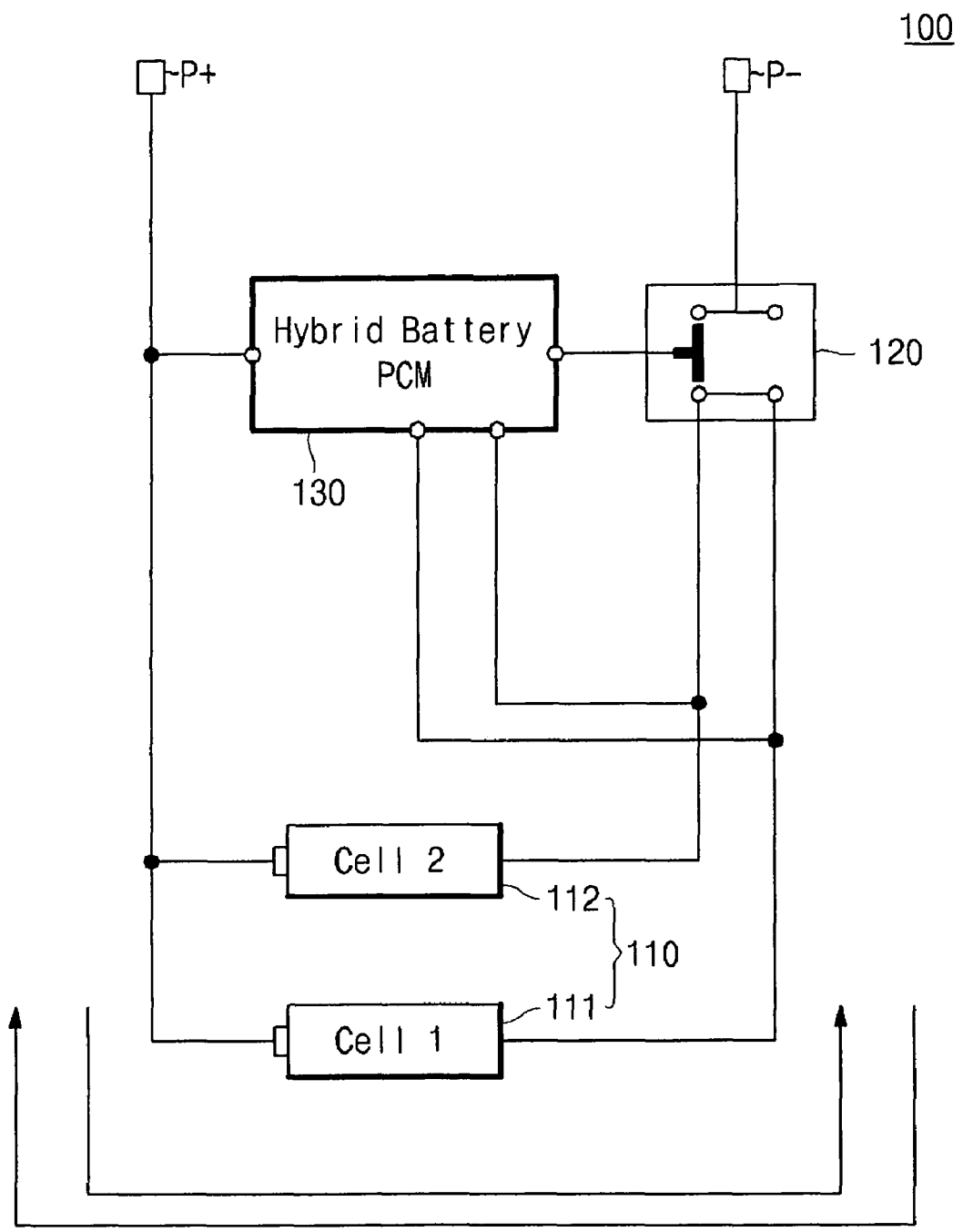
FIG. 1a is a circuit diagram of a hybrid battery in accordance with an exemplary embodiment of the present invention.

Hereinafter, a hybrid battery in accordance of an exemplary embodiment of the present invention is described in detail with reference to the accompanying drawings. In the entire description of the present invention, the same drawing reference numerals are used for the same elements across various figures. Also, explanations of the same elements across various figures are not repeated for the sake of brevity.

FIG. 1a is a circuit diagram of a hybrid battery in accordance with an exemplary embodiment of the present invention.

Referring to FIG. 1a, a hybrid battery 100 in accordance with the present invention includes a plurality of rechargeable batteries 110, a switching element 120, and a hybrid battery protection circuit 130.

For convenience of explanation in FIG. 1a, the plurality of rechargeable batteries are shown as a first battery 111 and a second battery 112, the switching element 120 is electrically connected to a high current path of the first and second batteries 111 and 112, and the hybrid battery protection circuit 130 is electrically connected to the first and second batteries 111 and 112 and the switching element 120.

The first and second batteries 111 and 112 are rechargeable, have capacities different from each other, and are electrically connected to each other. The first and second batteries 111 and 112 may be formed of a battery pack consisting of a plurality of batteries.

The first and second batteries 111 and 112 both may be can-type or pouch-type batteries. Furthermore, the capacities of the first and second batteries 111 and 112 may be different from each other. As such, when batteries having different types and capacities with one another are mixed in use, it may be possible to increase space usability when mounting them in a portable electronic device (not shown).

The switching element 120 which is electrically connected to high current paths of the first and second batteries 111 and 112, selects one of the first and second batteries 111 and 112, and enables it to be charged/discharged. Such a switching element 120 may include electrical devices functioning as switches and is connected to respective high current paths of the first and second batteries 111 and 112, thus switching on or cutting off the high current paths. Such a switching element 120 is controlled by a signal input from the hybrid battery protection circuit 130 and then switched on/off.

The hybrid battery protection circuit 130 transmits an on/off signal to the switching element 120 to select one of the first and second batteries 111 and 112 and charges or discharges it in sequence. Such a hybrid battery protection circuit 130 includes a plurality of logic elements, passive elements and active elements integrated, and driven with power provided by one of the first and second batteries 111 and 112. In order that the hybrid battery protection circuit 130 is driven with the power provided by one of the first and second batteries 111 and 112, it should be electrically connected to positive electrode/negative electrode of the first and second batteries 111 and 112 as shown in FIG. 1a.

In the hybrid battery in accordance with the present invention which has a configuration described above, since the hybrid battery protection circuit 130 charges and discharges the first and second batteries 111 and 112 having different capacities and shapes in the charging/discharging method modified to them, it may solve the problem of non-uniform charging/discharging caused by the capacity difference between the first and second batteries 111 and 112. At the same time, by mixedly using the rechargeable batteries having different types and configurations, such as a can type battery and a pouch type battery, the useable space may be increased when mounting them in the portable electronics. Furthermore, since the hybrid battery protection circuit 130 is driven with power provided by the first and second batteries 111 and 112, it is possible to automatically control charging/discharging of the first and second batteries 111 and 112.

Figure 1B:
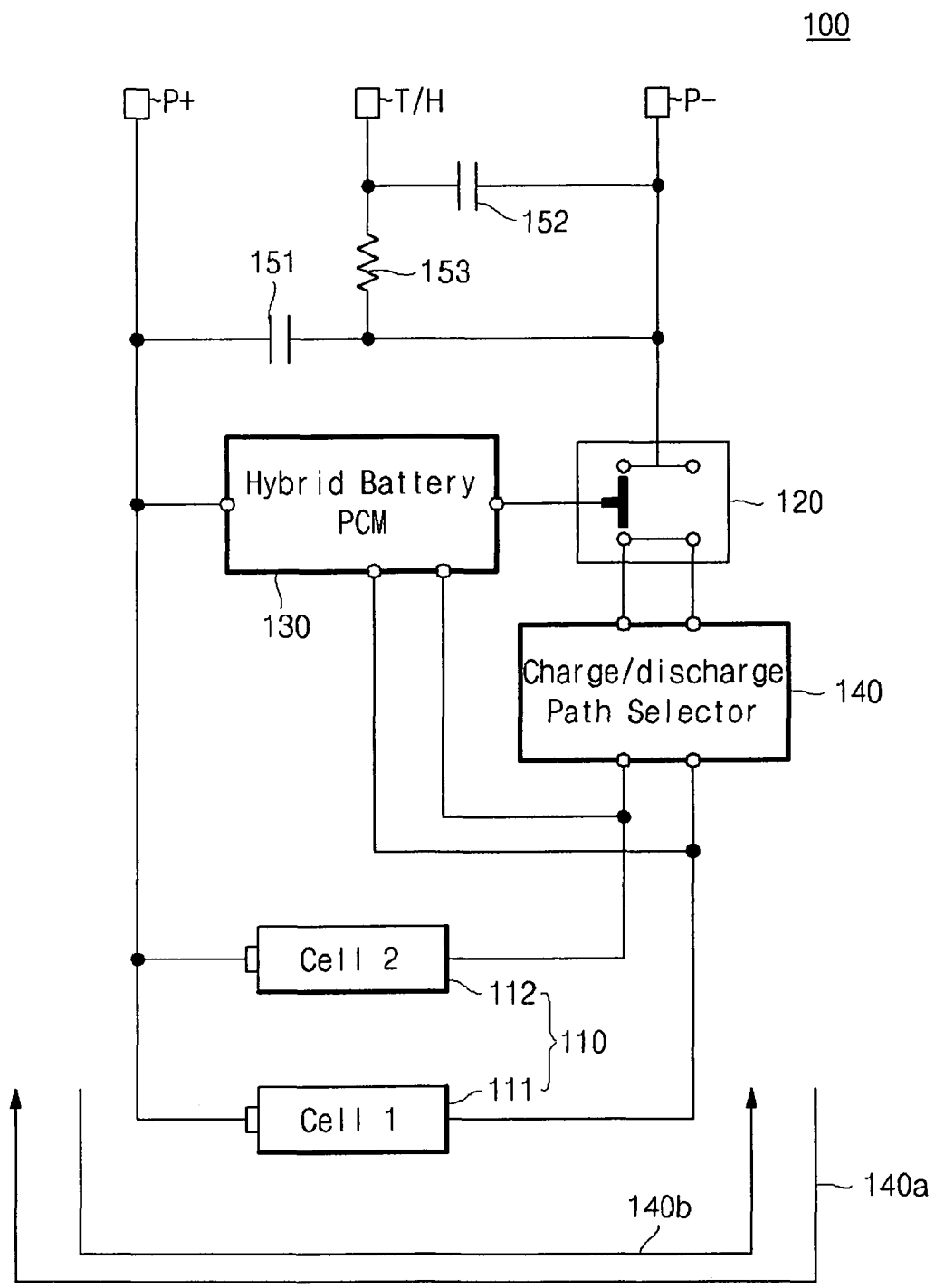
FIG. 1b is a circuit diagram corresponding to FIG. 1a with a charging/discharging path element added thereto.

FIG. 1b is a circuit diagram corresponding to FIG. 1a with an added charging/discharging path.

Referring to FIG. 1b, a charge/discharge path selector 140 is further arranged between the first and second batteries 111 and 112. The charge/discharge path selector 140 selects a charge path 140b allowing current to flow to the selected battery in a forward direction, and a discharge path 140a allowing current to flow in the reverse direction of the charge path 140b. Such a charge/discharge path selector 140 prevents erroneous operations by cutting off current flowing in the discharge path 140a when charging the first and second batteries 111 and 112, and by cutting off current flowing in the charge path 140b when discharging them in the same manner. Such a charge/discharge path selector 140 may include diode and switching elements, or an integrated circuit including logic and electrical elements.

Furthermore, the first and second batteries 111 and 112 are electrically connected to charge/discharge terminals (+P, -P), a first capacitor 151 is arranged between the positive charge/discharge terminal (+P) and the negative charge/discharge terminal (-P) to cut off a direct voltage therebetween, and a second capacitor 152 which is electrically connected to one of the positive charge/discharge terminal (+P) and the negative charge/discharge terminal (-P) is also included. A resistor 153 which electrically connects the first and second capacitors 151 and 152 is connected to an auxiliary terminal T/H. Accordingly, when the auxiliary terminal T/H and the charge/discharge terminal (+P, -P) are connected to a charger or a battery terminal of the portable electronics, it provides the charger or portable electronics with the resistance value of the resistor 153, informing them of their types and characteristics.

Figure 2A:
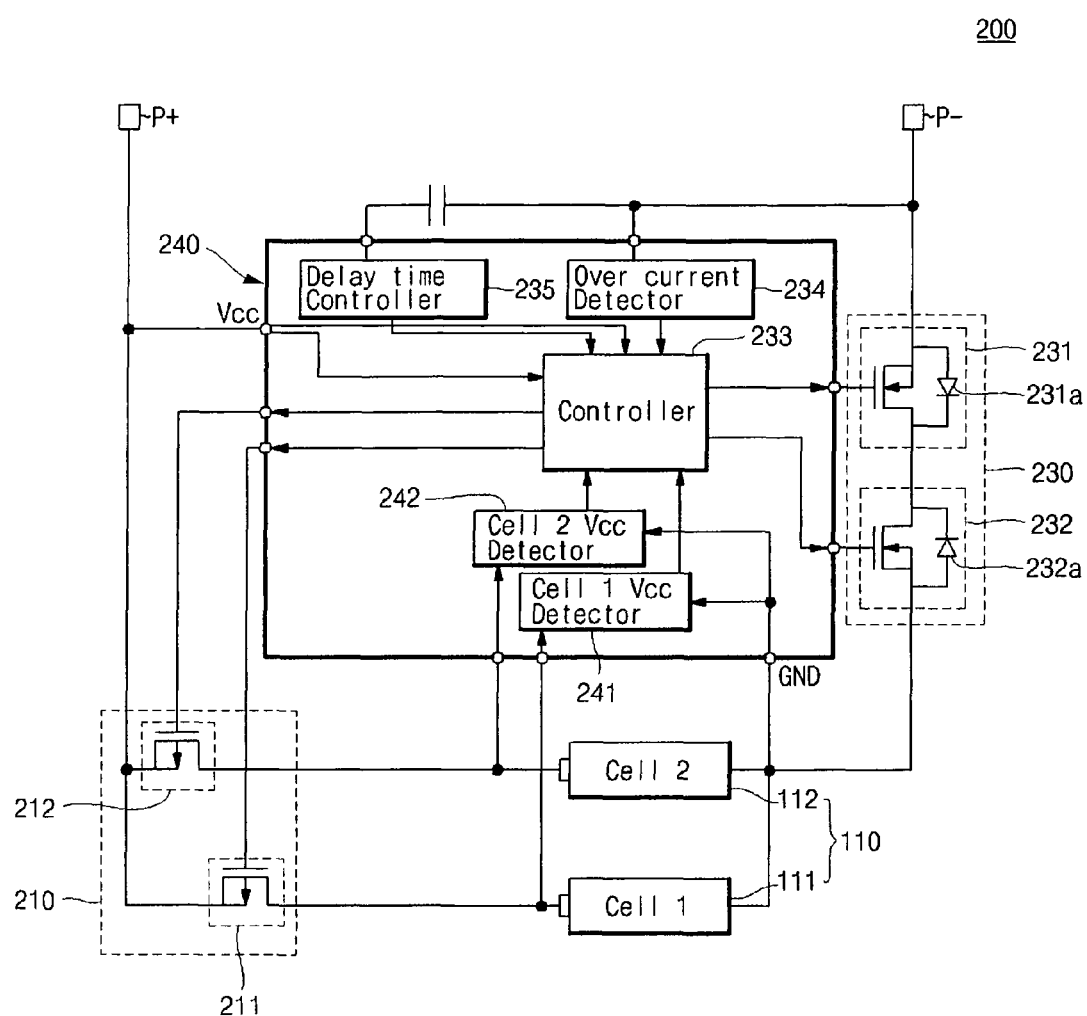
FIG. 2a is a circuit diagram of a hybrid battery in accordance with another exemplary embodiment of the present invention.

FIG. 2a is a circuit diagram of a hybrid battery in accordance with another exemplary embodiment of the present invention.

Referring to FIG. 2a, a hybrid battery 200 of the present invention includes a plurality of rechargeable batteries 111 and 112, a battery selection switching element 210 for selecting batteries, a charge/discharge switching element 230 for selecting a charge/discharge path of batteries selected by the battery selection switching element 210, and a hybrid battery protection circuit 240 for controlling the battery selection switching element 210 and the charge/discharge switching element 230.

The plurality of rechargeable batteries is shown as first and second batteries 111 and 112 in FIG. 2a for the convenience of description. The battery selection switching element 210 is divided into a first switching element 211 which is electrically connected to a high current path of the first battery 111 and a second switching element 212 which is electrically connected to a high current path of a second battery 112. Furthermore, the charge/discharge switching element 230 is connected to a point at which the high current paths of the first and second batteries 111 and 112 meet, and the hybrid battery protection circuit 240 is electrically connected to the first and second batteries 111 and 112, the battery selection switching element 210 and the charge/discharge switching element 230, as shown in FIG. 2a.

The battery selection switching element 210 includes a first switching element 211 connected to the first battery 111 and a second switching element 212 connected to the second battery 112. As such, each of the first and second batteries 112 may be separately connected to the high current path, respectively, by attaching a switching element to each battery.

The charge/discharge switching element 230 includes the charge switching element 231 which is electrically connected to a point at which the high current paths of the first and second batteries 111 and 112 meet, and the discharge switching element 232 which is electrically connected to the charge switching element 231. Such charge/discharge switching elements 231 and 232 are arranged on one high current path line so as to reduce the length of circuit patterns, and the charge switching element 231 is turned on by a hybrid battery protection circuit 240 when charging, thus connecting to a charge path selected from the high current paths of the first and second batteries 111 and 112. Since the charge path means a direction to which the first or second battery 111 or 112 should be charged by a charger (not shown) connected thereto, current flows in a counter-clock wise direction. On the contrary, the discharge switching element 232 causes current to flow in a clock wise direction between the high current paths of the first and second batteries 111 and 112, which is a reverse direction of the charge path.

The hybrid battery protection circuit 240 further includes voltage detectors 241 and 242 and a controller 240, each including a plurality of logic elements, passive elements and active elements. Referring to FIG. 2a, the voltage detectors are divided into the first voltage detector 241 which is electrically connected to the first battery 111 and the second voltage detector 242 which is electrically connected to the second battery 112.

Figure 2B:
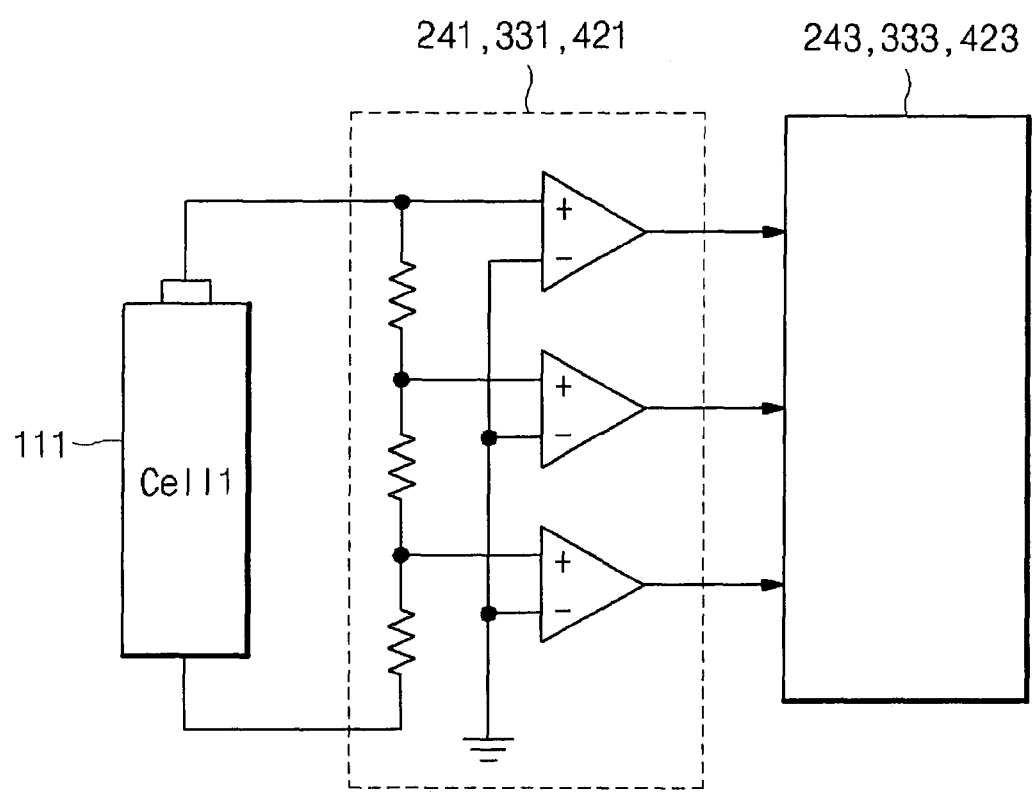
FIG. 2b is a circuit diagram of a voltage detector and its peripheral components exemplified for use in FIG. 2a, FIG. 3 and, FIG. 4.

The first voltage detector 241 compares the voltage of the first battery 111 with plural reference voltages. Such a first voltage detector 241 may classify states of the first battery 111 according to the voltage measured in the first battery. The classification method will be described as follows, with reference to FIG. 2b again. The first voltage detector 241 supplies a reference voltage to a plurality of operational amplifiers and compares the voltage measured in the first battery 111 and the reference voltage supplied to the operation amplifiers, so that it may classify the state of the first battery 111. The classified states may be states of full-charge and full-discharge. Furthermore, the classification may further include overcharging and overdischarging. As such, a digital signal output according to the state classified in the first detector 241 is supplied to the controller 233 and accordingly the controller 233 which has received the signal identifies the state information of the first battery 111, so that the controller 233 turns on/off the battery selection switching element 210 and the charge/discharge switching element 230.

The second voltage detector 242 compares the voltage of the second battery 112 with the plurality of the reference voltages. By comparing the measured voltage with the reference voltages, the state of the second battery 112 may be classified into the full-charging state and full-discharging state. Furthermore, the classification may further include the overcharging and over-discharging states. As such, the second voltage detector 242 may have the same configuration as the first voltage detector 241 described above.

The controller 233 outputs an on/off signal to the battery selection switching element 210 and selects one of the first and second batteries 111 and 112. Furthermore, the controller 233 outputs an on/off signal to the charge/discharge switching element 230 and selects the charge/discharge path of the first or second battery 111 or 112 selected by the battery selection switching element 210. The first and second voltage detectors 241 and 242 detect the voltage depending on the charge/discharging state of the first or second battery 111 or 112, and output the digital signal depending on the charge/discharge to the controller 233. The controller 233 which has received such a digital signal forms a charge path by turning on the charge switching element 231 of the charge/discharge switching element 230, or a discharge path by turning on the discharge switching element 232. After selecting the charge path or discharge path, one of the first and second batteries 111 and 112 is charged or discharged while selectively turning on the first switching element 211 or the second switching element 212. The controller 233 senses terminal voltages of the charge/discharge terminals (P+, P−) and determines whether the state is charging or discharging.

The hybrid battery protection circuit 240 may further include an over-current detector 234 which senses current flowing between the first and second batteries 111 and 112 and turns off the charge/discharge switching element 230. Such an over-current detector 234 prevents the hybrid battery protection circuit 240, circuits of the portable electronics (not shown) or the charger (not shown) or the first and second batteries 111 and 112 from being damaged when current rapidly flows in and out of the circuit.

When the first and second batteries 111 and 112 are fully discharged and the first controller 233 whose power source is cut off loses its control function, the over-current detector 234 senses that the charger (not shown) is connected to the positive/negative charge/discharge terminals (P+, P−) so that it may turn on the charge switching element 231 and at the same time turn on one of the first and second switching elements 211 and 212. Accordingly, one of the first and second batteries 111 and 112 may be selected to be charged.

The hybrid battery protection circuit 240 may further include a switching delay time controller 235 which controls a switching time difference between a charge switching element 231 and a discharge switching element 232. In the hybrid battery protection circuit 240 including such a switching delay time controller 235, passive elements, such as a capacitor and a resistor, are connected to one terminal of the switching delay time controller 235, so that the time needed to switch the charge switching element 231 and the discharge switching element 232 may be controlled.

The hybrid battery protection circuit 240 may be a semiconductor device integrated circuit. The hybrid battery protection circuit 240 may be formed of one chip of a semiconductor chip package type, for example, a semiconductor chip package having 8 to 10 pins. A power supply (not shown) which is electrically connected to the first and second batteries 111 and 112 is used as a power source of the hybrid battery protection circuit 240, providing the hybrid battery protection circuit 240 with stable rectified power. When the hybrid battery protection circuit 240 is fabricated in a semiconductor chip package type, integration may be embodied so as to imply functions and the hybrid battery protection circuit 240 may be mounted on an insulating substrate (not shown) or the like.

The battery selection switching elements 211 and 212 include P-channel field effect transistor. Also, the charge/discharge switching elements 231 and 232 are N channel field effect transistors and a charge or discharge path may be turned on among the high current paths of the first and second batteries 111 and 112 by an on signal of the hybrid battery protection circuit 240.

Reverse current prevention parasitic diodes 231a and 232b may be included in each of the charge/discharge switching elements 231 and 232. The reverse current prevention parasitic diode 231a connected to the charge switching element 231 cuts off the discharge path in a clock wise direction when the charge switching element 231 is turned on and connects to the charge path in which current of the first and second batteries 111 and 112 flows in the counter-clock wise direction. In the like manner, the reverse current prevention parasitic diode 232b is formed in the discharge switching element 232, too and the charge path is cut off when discharging the first/second batteries 111 and 112.

Figure 3:
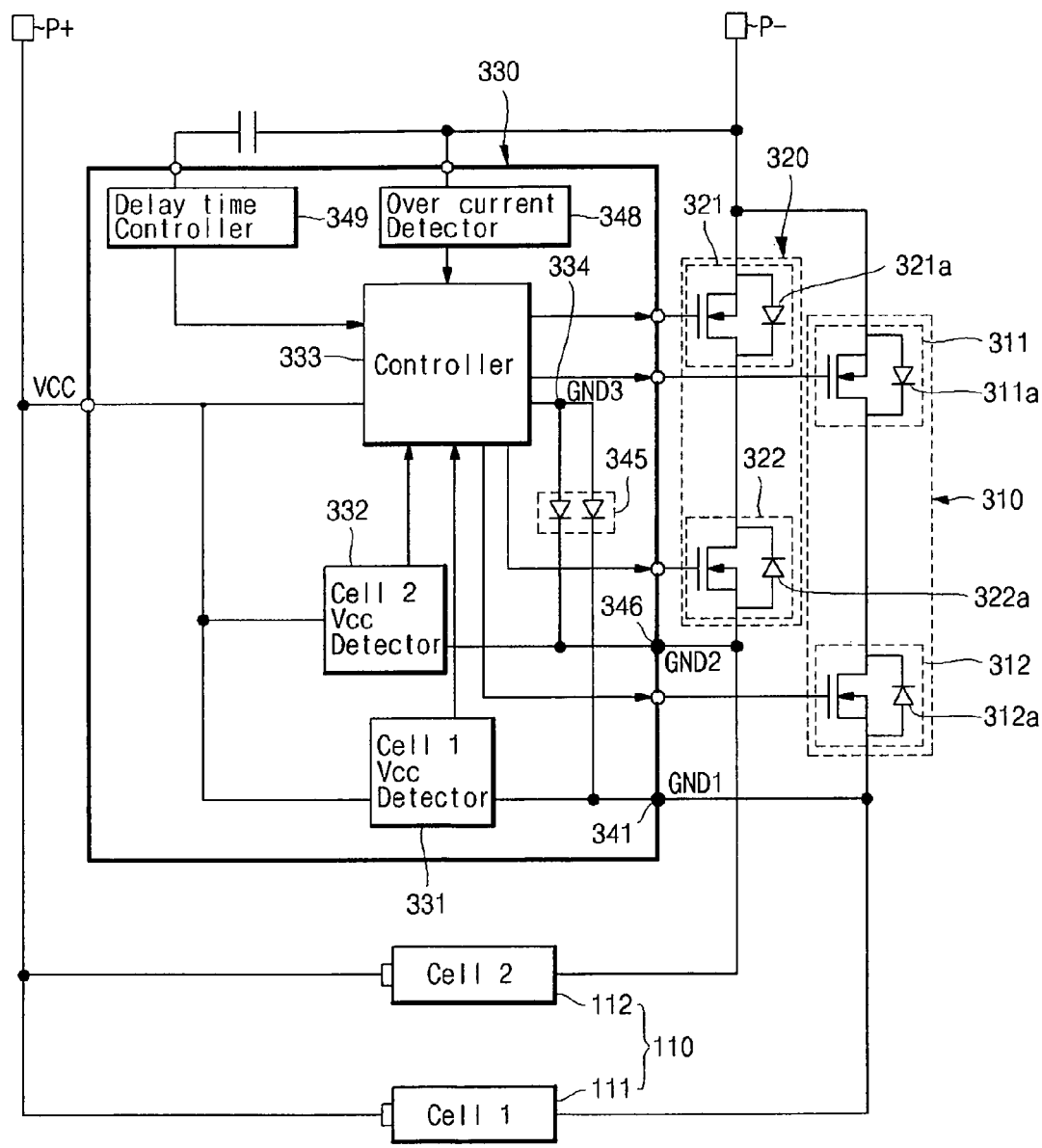
FIG. 3 is a circuit diagram illustrating a hybrid battery in accordance with still another exemplary embodiment of the present invention.

FIG. 3 is a circuit diagram of a hybrid battery in accordance with still another exemplary embodiment of the present invention.

Referring to FIG. 3, the hybrid battery 300 of the present invention includes a plurality of rechargeable batteries 111 and 112, charge/discharge switching elements 310 and 320, and a hybrid battery protection circuit 330.

In an exemplary drawing of FIG. 3, the plurality of rechargeable batteries is shown as the first battery 111 and the second battery 112 for the convenience of description, and the charge/discharge switching element is divided into a first charge/discharge switching element 310 and a second charge/discharge switching element 320 which are electrically connected to the first and second batteries 111 and 112, respectively. Furthermore, the hybrid battery protection circuit 330 is electrically connected to the first/second batteries 111 and 112 and the first/second charge/discharge switching elements 310 and 320.

The first charge/discharge switching element 310 includes a first discharge switching element 312 which is electrically connected to one end of the first battery 111, and a first charge switching element 311 which is electrically connected to the first discharge switching element 312. The first charge switching element 311 connects the path between the first battery 111 and the negative charge/discharge terminal (P−) in response to an on signal output from the controller 333 to charge the first battery 111. The first discharge switching element 312 connects the path between the first battery 111 and the negative charge/discharge terminal (P−) in response to the on signal output from the controller 333 to discharge the first battery 111.

Furthermore, like the first charge/discharge switching element 310, the second charge/discharge switching element 320 includes a second discharge switching element 322 which is electrically connected to one end of the second battery 112 and a second charge switching element 321 which is electrically connected to the second discharge switching element 322. The second charge switching element 321 connects the path between the second battery 112 and the negative charge/discharge terminal (P−) in response to an on signal output from a second controller 333 to charge the second battery 112. The second discharge switching element 322 connects the path between the second battery 112 and the negative charge/discharge terminal (P−) in response to the on signal output from the second controller 333 to discharge the second battery 112.

The hybrid battery protection circuit 330 includes the voltage controllers 331 and 332 and the controller 333. Such a hybrid battery protection circuit 330 may be formed by integrating a plurality of logic elements, positive elements and active elements. In this case, for the convenience of description, the voltage controller is divided into the first voltage detector 331 for detecting the voltage of the first battery 111 and the second voltage detector 332 for detecting the voltage of the second battery 112 as shown in FIG. 3.

The first voltage detector 331 compares the voltage of the first battery 111 with a plurality of reference voltages. Such a first voltage detector 331 classifies the state of the first battery 111 according to the measured voltage of the first battery 111. The classification method is described as follows with reference to FIG. 2b again. The first voltage detector 311 supplies the reference voltage to a plurality of operation amplifiers, controls the amplitude of the measured voltage of the first battery 111 by a resistor and classifies the state of the first battery 111. The first battery 111 may be classified into a full-charging state of about 4.1 V and a full-discharging state of about 3.0 V. Since voltages for such states are determined by the reference voltage supplied to the plurality of operational amplifiers, a variety of voltages may be selected. As such, the on signal output according to the state classified in the first voltage detector is supplied to the controller 333, and accordingly the controller 333 to which the signal has been supplied identifies state information of the first battery 111.

The second voltage detector 332 compares the voltage of the second battery 112 with a plurality of reference voltages. Furthermore, by comparing the measured voltage with the reference voltage, the state of the second battery 112 may be classified into the full-discharging state and the full-charging state. Such a second voltage detector 332 may be formed of the same configuration as the first voltage detector 332 described above.

The controller 333 may charge/discharge the first and second batteries 111 and 112 according to the states of the first and second batteries 111 and 112 detected from the first and second detectors 331 and 332. At first, when a load (not shown) such as portable electronics is connected to the positive charge/discharge terminal (P+) and the negative charge/discharge terminal (P−) and a discharge occurs, the controller 333 turns on the first discharge switching element 312 and discharges the first battery 111. Next, when the first battery 111 is discharged up to a breakdown voltage set in the first voltage detector 331, the first discharge switching element 312 is turned off and the discharge of the first battery 111 is stopped, and at the same time the second discharge switching element 332 is turned on and the second battery 112 is discharged. Subsequently, when the discharge is performed up to the breakdown voltage set in the second discharge detector 332 or the full-discharge voltage, the second discharge switching element 332 is turned off and the discharge of the second battery 112 is stopped. When a charger (not shown) is connected to the positive charge/discharge terminal (P+) and the negative charge/discharge terminal (P−) to perform charging, the first charge switching element 311 is turned on and the first battery 111 is charged. Next, when the first battery 111 is charged up to the breakdown voltage set in the first voltage detector 331, it turns off the first charge switching element 311 and the charge of the first battery 111 is stopped, and simultaneously, the second charge switching element 321 is turned on and the second battery 112 is charged. Subsequently, when the charge is performed up to the breakdown voltage set in the second voltage detector 332 or the full-charge voltage, the second charge switching element 322 is turned off and the charge of the second battery 112 is stopped. The controller 333 may sense the terminal voltage of the charge/discharge terminals (P+, P−) and determine whether the battery state is charge or discharge.

The hybrid battery protection circuit 330 may further include an over current detector 348 which senses current flowing in the first and second batteries 111 and 112 and turns off the first charge/discharge switching elements 311 and 312 and the second charge/discharge switching elements 331 and 321. Such an over current detector 348 may be formed by supplying the reference voltage to the operational amplifier as is to the first and second voltage detectors 331 and 332, and may detect an abrupt voltage drop for an instantaneous over current inflow. Such an over-current detector 348 prevents the hybrid battery protection circuit 330, circuits of the portable electronics (not shown) or the charger (not shown) or the first and second batteries 111 and 112 from being damaged when current rapidly flows in and out of the circuit.

When the first and second batteries 111 and 112 are fully discharged and the first controller 333 whose power source is cut off loses its control function, the over-current detector 348 senses that the charger (not shown) is connected to the positive/negative charge/discharge terminals (P+, P−) and selects one of the first charge switching element 311 and second charge switching element 321 and turns it on. Accordingly, one of the first and second batteries 111 and 112 is selected to be charged. The hybrid battery protection circuit 330 may be driven by the power source supplied from the charger.

The controller 330 together with the reverse current prevention diode 345 are commonly connected to a first ground of the first battery 111 and a second ground of the second battery 112 and form a common ground 244. So, although one of the first and second batteries 111 and 112 is fully discharged by the common ground 344, power may be provided to drive the controller 330 using the other of the first and second batteries 111 and 112. The reverse current prevention diode 345 cuts off current flowing in the first and second grounds 341 and 346.

The hybrid battery protection circuit 330 may further include a switching delay time controller 349 which controls a switching time difference between the first charge switching element 311 and the second charge switching element 321 and the first/second discharge switching elements 312 and the second discharge switching element 322. In the hybrid battery protection circuit 330 including such a switching delay time controller 249, passive elements such as a capacitor and a resistor are connected to one terminal of the switching delay time controller 349, so that time needed to switch the first charge switching element 311 and the second charge switching elements 321 and the first discharge switching element 312 and the second discharge switching element 322 may be controlled.

The hybrid battery protection circuit 330 may include a semiconductor device integrated circuit. The hybrid battery protection circuit 330 having functions described above is formed in a semiconductor chip package, including about 8 to 10 pins. When the circuit is formed in the semiconductor chip package, it is easy to mount the circuit on the insulating substrate in a mass production arrangement, thereby reducing manufacturing costs.

In this case, the first charge switching elements 311 and the second charge switching elements 321 and the first discharge switching elements 312 and the second discharge switching elements 322 may include field effect transistors or the like, especially, N channel field effect transistors, so they serve as switches without an additional booster circuit.

Parasitic diodes 311a, 312a, 321a and 322a are formed in each of the first charge switching element 311, the second charge switching element 321, the first discharge switching element 312 and the second discharge switching element 322, thus preventing reverse current when charging or discharging. Since such parasitic diodes 311a, 312a, 321a and 322a were described in the embodiment described above, a detailed description thereof has been omitted.

Figure 4:
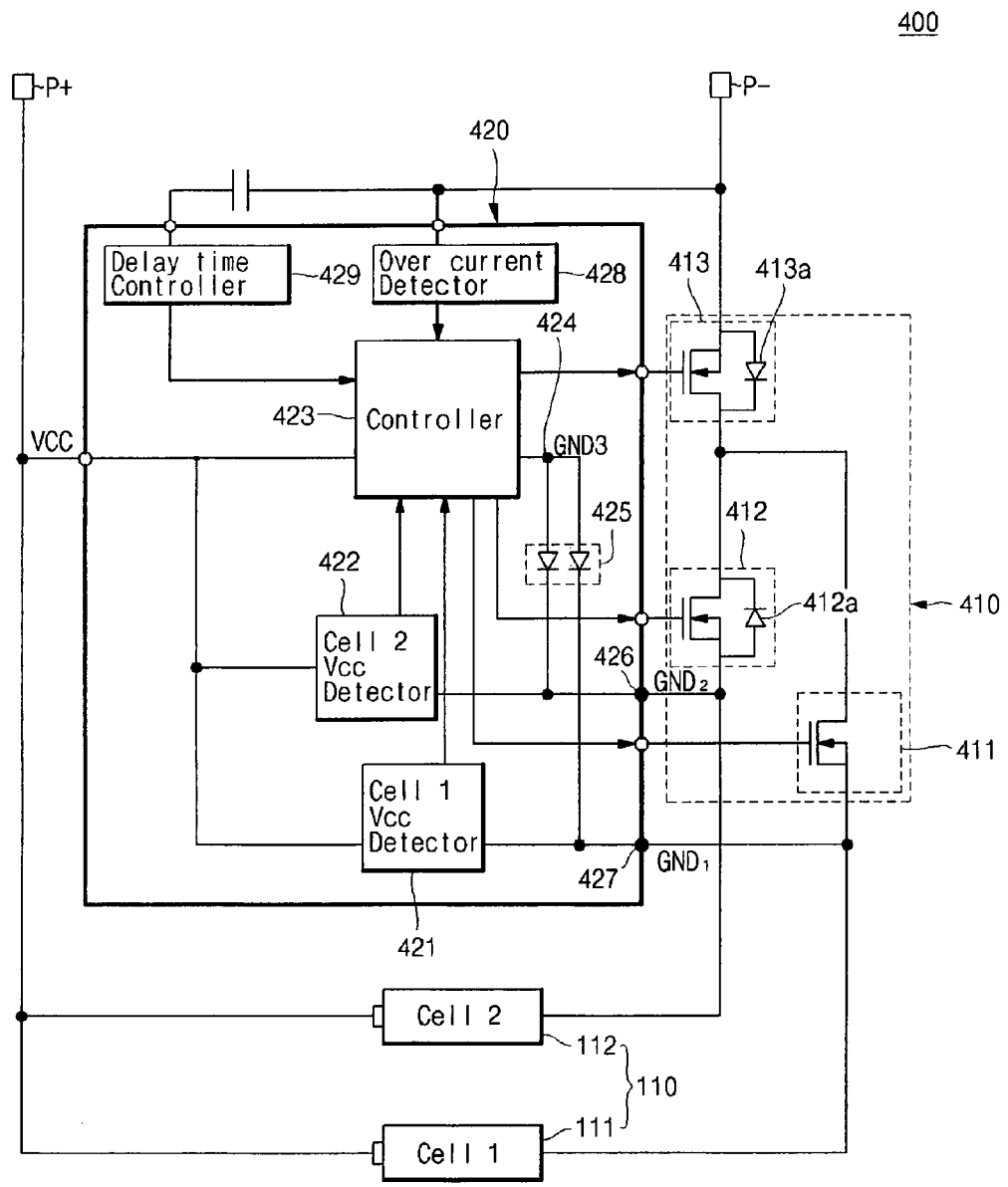
FIG. 4 is a circuit diagram of a hybrid battery in accordance with still another exemplary embodiment of the present invention.

FIG. 4 is a circuit diagram illustrating a hybrid battery in accordance with still another exemplary embodiment of the present invention.

Referring to FIG. 4, the hybrid battery 400 of the present invention includes a plurality of rechargeable batteries 111 and 112, a charge/discharge switching element 410, and a hybrid battery protection circuit 420.

In an exemplary drawing of FIG. 4, the plurality of batteries is limitedly shown as the first battery 111 and the second battery 112 for the convenience of description. Furthermore, a charge/discharge switching element 410 is divided into a first discharge switching element 411 which is electrically connected to a high current path of the first battery 111, a second discharge switching element 412 which are electrically connected to a high current path of the second battery 112, and a charge switching element 413 which is electrically connected to a point at which the high current paths of the first and second discharge switching elements 412 and 413 meet. Furthermore, the hybrid battery protection circuit 420 is electrically connected to the first/second batteries 111 and 112 and the charge/discharge switching elements 410.

In the charge/discharge switching element 410, the discharge switching elements 411 and 412 are connected to the first and second batteries 111 and 112, so each of charge paths of the first and second batteries 111 and 112 may be selected and batteries to be selected may be selectively controlled by one charge switching element 413.

The hybrid battery protection circuit 410 may be formed including the voltage detectors 421 and 422 and the controller 423. The voltage detector is divided into a first voltage detector 421 for detecting the voltage of the first battery 111 and a second detector 422 for detecting the voltage of the second battery 112.

The first voltage detector 421 compares the voltage of the first battery 111 with a plurality of reference voltages. Such a first voltage detector 421 classifies the state of the first battery 111 according to the measured voltage of the first battery 111. Since the first voltage detector 421 is the same as the voltage detector shown in FIG. 2b among other embodiments described above, detailed descriptions of the first and second voltage detectors 421 and 422 have been omitted.

The controller 423 charges/discharges the first and second batteries 111 and 112 according to the states of the first and second batteries 111 and 112 detected by the first and second detectors 421 and 422. First, when a load (not shown) such as portable electronics is connected to the positive charge/discharge terminal (P+) and the negative charge/discharge terminal (P−) to perform discharging, the controller 423 turns on the first discharge switching element 411 and discharges the first battery 111. Next, when the first battery 111 is discharged up to a breakdown voltage set in the first voltage detector 421 or the full-charge voltage, the first discharge switching element 411 is turned off and the discharge of the first battery 111 is stopped, and simultaneously the second discharge switching element 412 is turned on and the second battery 112 is discharged. Subsequently, when the discharge is performed up to the breakdown voltage set in the second voltage detector 422 or the full-discharge voltage, the second discharge detector 412 is turned off and the discharge of the second battery 112 is stopped. Furthermore, when a charger or the like is connected to the positive charge/discharge terminal (P+) and the negative charge/discharge terminal (P−) and a charge is performed, the first charge switching element 311 and the charge switching element 413 are turned on and the first battery 111 is charged. Next, when the first battery 111 is charged up to the breakdown voltage set in the first voltage detector 421, it turns off the first discharge switching element 411 and the charge of the first battery 111 is stopped, and at the same time the second discharge switching element 412 is turned on and the second battery 112 is charged. Subsequently, when the charge is performed up to the breakdown voltage, set in the second voltage detector 422 or the full-charge voltage, the second discharge switching element 312 is turned off and the charge of the second battery 112 is stopped. In this case, when one of the first and second batteries 111 and 112 is over charged, the charge switching element 413 is turned off and the charge of the first and second 111 and 112 is stopped. Furthermore, the controller 423 senses the terminal voltage of the charge/discharge terminals (P+, P−) and determines whether the battery state is charged or discharged.

The hybrid battery protection circuit 420 may further include an over current detector 428 which senses current flowing in the first and second batteries 111 and 112 and turns off the first discharge switching elements 411 and the second discharge switching elements 412. Since such an over current detector 428 serves as the over current detector described above, a detailed description thereof has been omitted.

When the first and second batteries 111 and 112 are fully discharged and the first controller 423 whose power source is cut off loses its control function, the over-current detector 428 senses that the charger (not shown) is connected to the positive/negative charge/discharge terminals (P+, P−) and turns on the charge switching element 413 and simultaneously one of the first and second discharge switching elements 411 and 412. Accordingly, one of the first and second batteries 111 and 112 is selected and charged.

The hybrid battery protection circuit 420 may further include a switching delay time controller 429 which controls a switching time difference between the charge switching element 413 and the first/second discharge switching elements 411 and 412. In the hybrid battery protection circuit 420 including such a switching delay time controller 429, passive elements, such as a capacitor and a resistor, are connected to one terminal of the switching delay time controller 429, so that the time needed to switch the charge switching element 413 and the first discharge switching element 411 and the second discharge switching elements 412 may be controlled.

The hybrid battery protection circuit 420 may be a semiconductor device integrated circuit. The hybrid battery protection circuit 420 may be one chip, such as a semiconductor chip package type, including about 8 to 10 pins. A power supply (not shown) which is electrically connected to the first and second batteries 111 and 112 is further included as a power source of the hybrid battery protection circuit 420, providing the hybrid battery protection circuit 420 with a stable rectified power source. When the hybrid battery protection circuit 420 is fabricated in a semiconductor chip package, integration may be embodied so as to imply functions and the hybrid battery protection circuit 420 may be mounted on an insulating substrate (not shown) or the like.

Also, the charge switching element 413, the first discharge switching element 411 and the second discharge switching element 412 include an N channel field effect transistor or a P channel field effect transistor, and a charge or discharge path in the high current path of the first or second battery 111 or 112 may be turned on or off in response to an on or off signal of the hybrid battery protection circuit 420.

Furthermore, reverse current prevention parasitic diodes 413a and 412a may be included in one of the charge switching element 413, the first discharge switching element 411 and the second discharge switching element 412. In the reverse current prevention parasitic diode 413a connected to the charge switching element 413, the charge switching element 413 turns on and cuts off the discharge path among the high current paths when the charge path is connected to the high current path of the first and second batteries 111 and 112.

Figure 5:
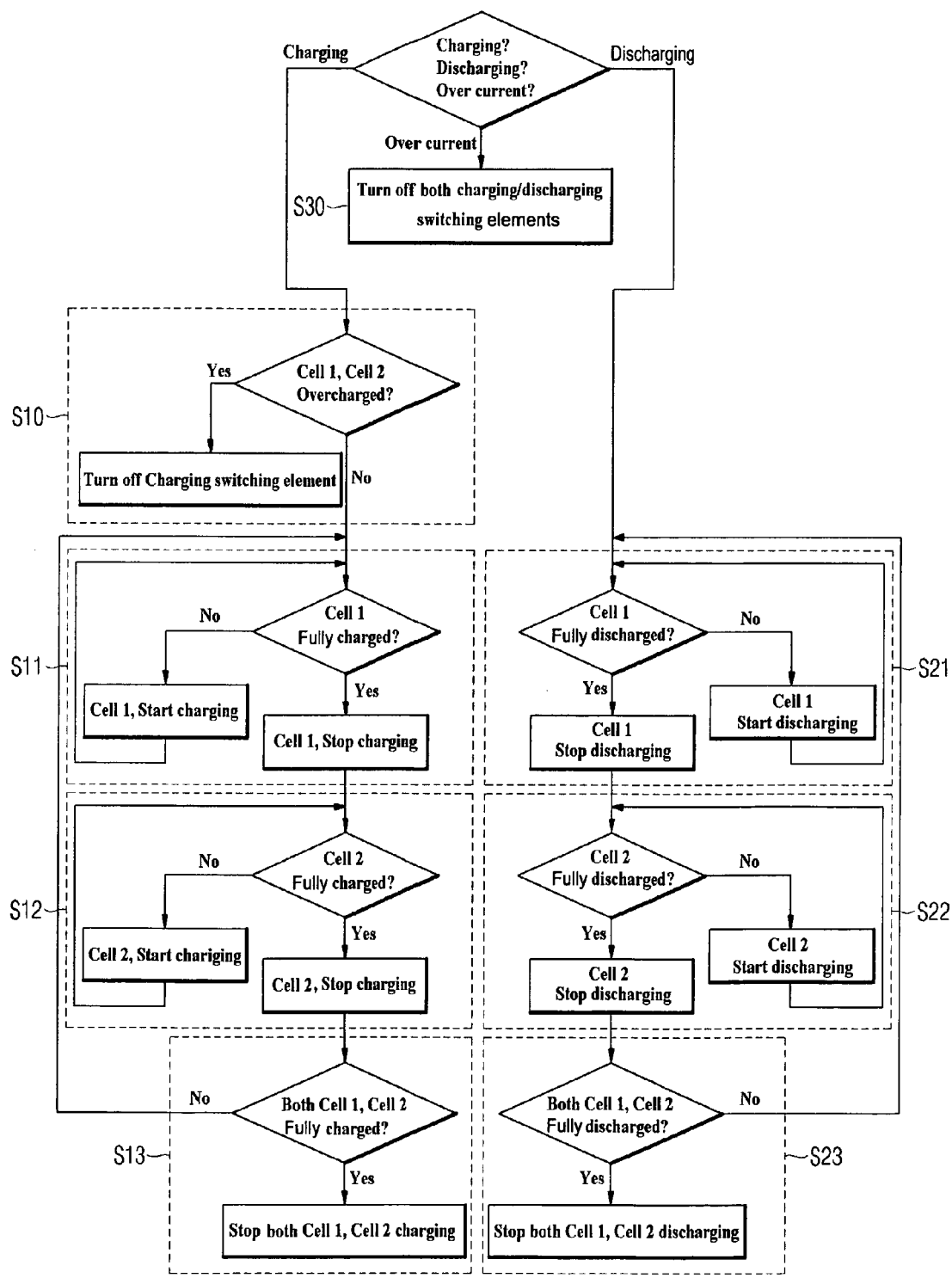
FIG. 5 is a flowchart of the charging/discharging method of a hybrid battery in accordance with one exemplary embodiment of the present invention.

FIG. 5 is a flowchart of the charging/discharging method of a hybrid battery in accordance with one exemplary embodiment of the present invention.

In order to describe the charging method of a hybrid battery of the present invention in detail, a description will be given with reference to FIG. 5 which is a flowchart of a charging method. Furthermore, the charging method of a hybrid battery of FIG. 5 is described below with reference to a circuit diagram of FIG. 2a.

The hybrid battery charging method of the present invention include a first step S11, a second step S12 and, a third step S13.

First, in the first step S11, when a charger (not shown) or the like is connected to a high current path of the first and second batteries 111 and 112, one of the first and second batteries 111 and 112 is selected and its charging state is identified. For example, when the first battery 111 is selected and its charging state is identified, the charging state of the first battery 111 is detected in the first voltage detector 241, which determines whether or not the battery state is fully charge. The fully charged state refers to a state in which the voltage of the first battery 111 is slightly lower than that of the over charging state, for example, about 4.1 V. The reason to define the fully charged state is to selectively charge the first and second batteries 111 and 112. Accordingly, the potential of the fully charged state may be arbitrarily defined. Furthermore, the first voltage detector 241 determines the over charging state of the first battery 111 having the potential higher than that of the fully charged state. Next, when identified state of the first battery 111 is not the fully charged state, charging starts using a charging method that meets the battery capacity of the first battery 111, and when the state of the first battery 111 is not the fully charged state, charging of the first battery 111 is prohibited. The charging method of the first battery 111 when the state of the first battery 111 is not fully charged is as follows. The first voltage detector 241 transfers the state information of the first battery 111 to the controller 233 and the controller 233 determines that the first battery 111 is not fully charged and outputs a signal. The controller 233 outputs an on signal to the first switching element 211 and the charge switching element 231 so as to turn on the first switching element 211 and the charge switching element 231, so the first battery 111 is charged until it is fully charged. On the contrary, the method to prohibit the charging of the first battery 111 when the first battery 111 is fully charged is to turn off the first switching element 211 by an off signal output from the first controller 133 and to cut off the high current path of the first battery 111.

In the second step (S12), after charging of the first battery 111 is prohibited when the first battery 111 is fully charged in the first step (S11), a determination is made as to whether the state of the second battery 112 is fully charged by identifying the charge state of the second battery 112. Next, when the second battery 112 is not in the fully charged state, the second battery 112 starts to be charged using a charging method that meets a battery capacity of the second battery 112, and when the second battery 112 is not in the full charged state, the charging of the second battery 112 is prohibited.

In the third step (S13), when both of the first and second batteries 111 and 112 are in the fully charged state, the charging of the first and second batteries 111 and 112 is prohibited. The method to prohibit the charging of the first and second batteries 111 and 112 is to turn off the charging switching element 211 or both of the first and second switching elements 211 and 212, so the first and second batteries 111 and 112 are cut off from the high current path to the positive/negative charge/discharge terminals (P+, P−).

Furthermore, the hybrid charging method may further include a step (S10) of identifying over charge where the first and second batteries 111 and 112 start to be discharged when the first and second batteries 111 and 112 are in the over charged state during the first to third steps (S11, S12 and S13). Such a step (S10) of identifying the battery over charging may be performed in the charging mode, where the charger (not shown) is connected to the positive/negative charge/discharge terminals (P+, P−) and charged. After the charging mode is started, the controller 233 determines the charging state of the first and second batteries 111 and 112 and turns on/off the charge/discharge switching elements 231 and 232 by the on/off signal output from the first controller 233. More specifically, the first controller 233 recognizes the states of the first and second batteries 111 and 112 by the first and second voltage detectors 241 and 242 connected to the first and second batteries 111 and 112. The over charging state of the first and second batteries 111 and 112 refers to a state where the first and second batteries 111 and 112 are over charged, and the first and second batteries 111 and 112 have maximum potentials in the over charging state, respectively. A reference of such a maximum potential may be set by the reference voltages of the first and second voltage detectors 241 and 242. According to the reference of the maximum potential set in the first and second voltage detectors 241 and 242, the first and second batteries 111 and 112 are recognized as being in the over charging state. Accordingly, the charging switching element 231 connected to the first and second batteries 111 and 112 is turned off, so the charging of the first and second batteries 111 and 112 is prohibited and the discharging switching element 232 and first or second switching element 211 or 212 are turned on, so the first or second battery 111 or 112 is discharged. Such an over charge identification step (S10) has a priority higher than the first to third steps (S11, S12 and S13).

When over current which is higher than the breakdown current set flows during the first to third steps (S11, S12 and S13), a charge/discharge prohibition step (S30) for turning off both of the charge/discharge switching elements 231 and 232 is performed simultaneously. The over current inflow in the charge/discharge prohibition step (S30) is performed when current flows from the outside while the first and second batteries 111 and 112 are being charging or when spontaneous current flows due to the contact defect in the terminal of charger or the like. When the over current flows from the outside, including such a case described above, the charge/discharge switching elements 231 and 232 are immediately turned off so as to protect the first and second batteries 111 and 112 and the hybrid battery protection circuit 240. Such charge/discharge step (S30) has a priority higher than the first to third steps.

A detailed description of the hybrid battery discharging method of the present invention follows with reference to the flowchart of FIG. 5 and with reference to the circuit diagram of FIG. 2a. The hybrid battery discharging method of the present invention include a first step S21, a second step S22 and, a third step S23.

First, in the first step (S21), when a load is electrically connected to the positive/negative charge/discharge terminals (P+, P−) of the first and second batteries 111 and 112, and the batteries are in a discharging state, the battery state of one of the first and second batteries 111 and 112 is identified. For example, when the first battery 111 is selected and the discharging state of the first battery 111 has been identified, the first voltage detector 241 determines whether or not the full discharge has occurred. The full discharge refers to a state where the voltage of the first battery 111 has a potential slightly higher than the voltage of the over discharging state. The reason that such a full discharge state is defined is to selectively discharge the first and second batteries 111 and 112. Next, when the first battery 111 has not been fully discharged, the discharging is performed until first battery 111 is fully discharged, and when the first battery 111 is fully discharged, the discharging of the first battery 111 is prohibited. The method to discharge the first battery 111 fully is that the first voltage detector 241 transfers the state information of the first battery 111 to the controller 233 and the controller 233 determines that the first battery 111 is not fully discharged and outputs a signal. The controller 233 outputs an on signal to the first switching element 211 and the discharging switching element 232, so that the first battery 111 starts to discharge until it is fully discharged. On the contrary, the method to prohibit the discharging of the first battery 111 when the first battery 111 is fully charged is that the full discharging state information of the first battery 111 detected in the first voltage detector 241 is transferred to the controller 233, and the controller 233 outputs an off signal to the first switching element 211 so as to turn off the first switching element 211.

In the second step (S22), after the discharging of the first battery 111 is prohibited when the first battery 111 is fully discharged in the first step (S21), the discharging state of second battery 112 is identified and it is determined whether or not the second battery 112 is fully discharged. Next, when the second battery 112 is not fully discharged, the second battery 112 is discharged, and when the second battery 112 is fully discharged, the discharging of the second battery 112 is prohibited.

In the third step (S23), when both the first and second batteries 111 and 112 are fully discharged, discharging of both the first and second batteries 111 and 112 are prohibited. The method to prohibit the discharging of the first and second batteries 111 and 112 is that the discharge switching element 232 is turned off or the first and second switching elements 211 and 212 are turned off, so the high current paths between the first and second batteries 111 and 112 and the positive/negative charge/discharge terminals (P+, P−) are cut off.

When the over current that is higher than the set breakdown current flows during the first to third steps (S21, S22 and S23), a charge/discharge prohibition step (S30) for turning off the charge/discharge switching elements 231 and 232 is performed. Since the charge/discharge prohibition step (S30) is described in the hybrid battery charging method, a detailed description thereof has been omitted.

The hybrid battery charging method and discharging method described above may be applied to the hybrid batteries of the exemplary embodiments described above.

While the present invention has been shown and described with respect to the exemplary embodiments, it will be understood by those skilled in the art that various changes and modifications may be made without departing from the spirit and scope of the present invention as defined by the following claims.

The hybrid battery and charging/discharging method thereof increase the charge/discharge efficiency of the hybrid battery by selectively charging/discharging batteries whose capacities are different.

The hybrid battery protection circuit is driven using power of the battery only without separate power, so the batteries may be automatically charged/discharged.

Space usability when mounting the batteries on the portable electronics may be increased by mixing different types of batteries.

The hybrid batteries are protected by cutting off the current when over current flows during charging/discharging the hybrid batteries.

What is claimed is:

1. A hybrid battery, comprising:
a plurality of rechargeable batteries, each having high current paths;
a single switching element connected to the plurality of rechargeable batteries and selecting one of the high current paths of the rechargeable batteries by electrically connecting to one of the high current paths of the rechargeable batteries;
a hybrid battery protection circuit electrically connected to the plurality of rechargeable batteries and driven by power supplied by one of the plurality of rechargeable batteries, the hybrid battery protection circuit being electrically connected to the switching element and charging/discharging the plurality of rechargeable batteries in sequence by transmitting an on/off signal to the switching element; and
a single charging/discharging path selector electrically connected between the plurality of batteries and the switching element to select a charging path to enable current flowing into the selected batteries to flow in a forward direction and a discharging path to enable current flowing into the selected batteries to flow in a backward direction, the charging/discharging path selector being physically separated from the single switching element.

2. The hybrid battery as claimed in claim 1, wherein the plurality of rechargeable batteries comprise a can type battery and a pouch type battery.

3. The hybrid battery as claimed in claim 1, wherein the plurality of rechargeable batteries have different capacities.

* * * * *